United States Patent [19]

Shafer

[11] Patent Number: 5,181,027
[45] Date of Patent: Jan. 19, 1993

[54] METHOD AND APPARATUS FOR AN AIR TRAFFIC CONTROL SYSTEM

[75] Inventor: Tom R. Shafer, Marion, Iowa

[73] Assignee: Rockwell International Corporation, Seal Beach, Calif.

[21] Appl. No.: 729,112

[22] Filed: Jul. 12, 1991

Related U.S. Application Data

[63] Continuation-in-part of Ser. No. 469,624, Jan. 24, 1990, abandoned.

[51] Int. Cl.⁵ .............................................. G08G 5/04
[52] U.S. Cl. ................................. 340/961; 342/455; 364/461
[58] Field of Search ........................ 340/961, 706, 712; 364/461, 439, 440; 342/29, 36, 41, 182, 455; 244/76 R, 191, 194

[56] References Cited

U.S. PATENT DOCUMENTS

| 3,925,750 | 6/1972 | Gilbert et al. | 340/961 |
| 4,403,220 | 9/1983 | Donovan | 342/29 |
| 4,706,090 | 11/1987 | Hashiguchi et al. | 342/41 |
| 4,835,537 | 5/1989 | Manion | 340/961 |
| 4,914,733 | 4/1990 | Gralnick | 340/961 |

Primary Examiner—Jin F. Ng
Assistant Examiner—Brent A. Swarthout
Attorney, Agent, or Firm—Gregory G. Williams; M. Lee Murrah; H. Frederick Hamann

[57] ABSTRACT

An improved air traffic control (ATC) system which utilizes traffic alert and collision avoidance systems (TCAS) as a component together with a flight control computer of an aircraft autopilot, a data radio and an interactive touch screen display device to produce a system for allowing easy trailing of another aircraft on trans-oceanic flights and to reduce landing delays at busy airports under IFR conditions.

1 Claim, 2 Drawing Sheets

METHOD AND APPARATUS FOR AN AIR TRAFFIC CONTROL SYSTEM

CROSS REFERENCE TO RELATED APPLICATION

This is a continuation in part of an earlier filed patent application entitled "Improved Apparatus for Air Traffic Control System" filed by the same inventor on Jan. 24, 1990, and having Ser. No. 07/469,624, now abandoned, which application is incorporated herein by this reference.

FIELD OF THE INVENTION

The present invention generally relates to an air traffic control (ATC) system and more particularly concerns such systems together with traffic alert and collision avoidance systems (TCAS) and even more particularly concerns such TCAS with enhanced abilities to easily communicate and utilize unique aircraft identification information, especially for improved air traffic control for closely following aircraft on trans-oceanic flights and for landings at busy airports under IFR conditions.

BACKGROUND OF THE INVENTION

On trans-oceanic flights, it is often desirable to fly an aircraft through a narrow air current corridor where the aircraft can operate at peak performance. As a result, significant amounts of time and fuel can be saved, especially on extended flights. Since these corridors have been observed to remain relatively unchanged in location for several hours, it is often desirable to navigate several aircraft through the corridor at a given time. In fact, economically, it is preferable to navigate as many aircraft through these corridors as possible.

The current ATC system uses ground-based surveillance radar beacons and airborne transponders to track aircraft over land areas. However, since the surveillance radar does not extend across the ocean, the location of an aircraft on a trans-oceanic flight is not precisely known at all times. Consequently, in order to assure safe operation, aircraft have had to maintain great separation distances. With this uncertainty of location and the concomitant need for great separation distance, it has been difficult to take full advantage of these corridors.

With the advent of TCAS, many trans-oceanic aircraft are expected to be equipped with on-board surveillance as part of the TCAS equipment. However, with a typical TCAS, the flight crew on the TCAS protected aircraft will not be provided with all the desirable information regarding the aircraft surrounding them. Furthermore, the information that is provided is constantly changing and is often difficult to detect and interpret. For example, traffic information is typically provided to the flight crew by a display device showing the protected aircraft at the center of the display and the surrounding aircraft are shown in a full 360° circle around the protected aircraft. With such a display, a maneuver of the protected aircraft will cause all the representations of surrounding aircraft to be relocated on the display. This makes it difficult to keep track of any particular aircraft, especially when several maneuvers are made in a short time.

Similarly, when a busy airport comes under IFR conditions it often results in increased delays and take-offs and landings in order to comply with the increased separation requirements. If more aircraft could be safely guided through the narrow corridors on approach and take-off then the delays could be greatly reduced.

Consequently, there exists a need to utilize the TCAS system to provide an overall ATC system which is able to more safely exploit the benefits of navigating through narrow corridors by an enhancement of that TCAS system so it is more capable of easier communication and utilization of unique aircraft identification information.

SUMMARY OF THE INVENTION

It is an object of the present invention to provide an improved ATC for guiding numerous aircraft through narrow corridors.

It is a feature of the present invention to include a TCAS R/T with the capability to uniquely identify intruding aircraft.

It is an advantage of the present invention to provide additional identification information to the crew.

It is another object of the present invention to provide a TCAS with enhanced functionalities.

It is another feature of the present invention to couple an interactive display terminal, an enhanced TCAS and the flight control computer of a typical auto pilot.

It is another advantage of the present invention to provide for easy tracking of aircraft through a narrow corridor.

It is yet another feature of the present invention to include a variable display format of specific intruding aircraft by interactive display means, for example, touching the display symbol corresponding to a particular intruding aircraft.

It is yet another feature of the present invention to provide a TCAS display in which a crew member can select a particular intruding aircraft to be readily identified.

It is still another feature of the present invention to couple the TCAS, the display terminal and a data radio.

It is still another advantage of the present invention to provide the crew with additional information relating to a particular aircraft in response to a selection made by a crew member.

It is still another advantage to allow for selectable alert criteria to be applied to individual aircraft.

The present invention provides an improved air traffic control system designed to fulfill the aforementioned needs, satisfy the earlier propounded objects, include the above described features and achieve the previously stated advantages. The invention is carried out in a "confusion-less" fashion in the sense that the confusion, in determining a particular intruding aircraft symbol on a display after a brief glance to another instrument, is lessened, likewise the confusion in determining which intruding aircraft on the display to follow on a trans-oceanic flight or on approach to a busy airport in IFR conditions is reduced.

Accordingly, the present invention includes an air traffic control system having the capability of allowing a pilot to easily follow or trail another aircraft by uniquely identifying any particular aircraft on the TCAS display screen. The system includes a TCAS for providing on-board surveillance and collision avoidance, and an interactive display device for assisting the pilot in selecting a particular aircraft.

BRIEF DESCRIPTION OF THE DRAWINGS

The invention may be more fully understood by reading the following description of preferred embodiments of the present invention in conjunction with the appended drawings wherein.

DETAILED DESCRIPTION

Figure 1:
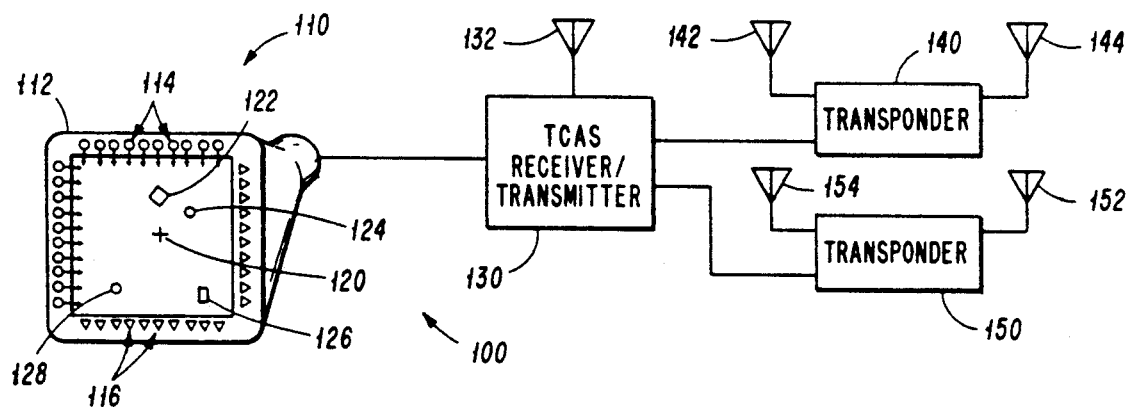
FIG. 1 is a schematic representation of an improved ATC/TCAS system of the present invention which includes a display device having four surrounding aircraft displayed thereon.

Now referring to FIG. 1, there is shown an improved air traffic control system of the present invention, generally designated 100, including an interactive display terminal 110 having an optical touch sensitive input device 112 disposed thereon. Input device 112 is shown having a plurality of light emitting diodes 114 and a corresponding number of light detecting diodes 116. However, any touch-sensitive display device may be used such as a surface-acoustic-wave (SAW) system which can sense the position of a touch and also the amount of pressure applied in several discrete levels. Such SAW systems are generally known in the art. Also, it is contemplated that other types of interactive display means may be used such as joysticks, reference bugs or mouses, etc. The touch screen is currently believed to be the most preferred interactive display but end users may prefer others.

Display 110 having a representation 120 centrally disposed which corresponds to the TCAS protected aircraft in which the equipment is installed. The TCAS protected aircraft is shown in the figures disposed at the exact center of the display screen, it is often preferable to center the protected aircraft from left to right but to locate it below the vertical center point in order to allow for more viewing area in front of the aircraft. However, in some circumstances the end user may prefer a different orientation. Also shown is a graphic representation 122 of a signal corresponding to an aircraft in front of the subject aircraft. Similarly, a graphic representation 124 represents an aircraft situated in front and to the right of the subject aircraft. Likewise, representations 126 and 128 represent aircraft disposed to the right and behind of the aircraft and to the left and behind of the aircraft respectively. Representations 122, 124 and 126 are shown having differing shapes which preferrably correspond to differing threat levels of the intruding aircraft. Also coupled with display 110 is TCAS receiver/transmitter (R/T) 130 having antenna 132 disposed thereon. R/T 130, or the like, are microprocessor controlled devices that are an essential component in FAA mandated TCAS equipment and are well known in the industry as well as the threat algorithms implemented therein. Coupled with receiver/transmitter 130 are transponders 140 and 150 having top antenna 142 and 152 respectively and further having bottom antenna 144 and bottom antenna 154 respectively. This TCAS described is merely a preferred embodiment, other configurations and systems which provide collision avoidance-surveillance and traffic alert functions may be substituted. Except for the addition of the touch screen capability, the TCAS system of FIG. 1 is well known in the art.

Figure 2:
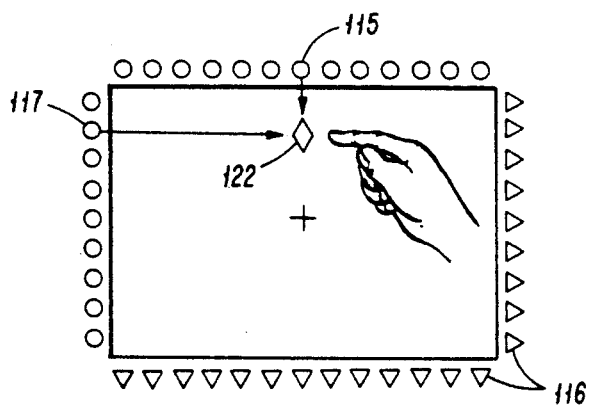
FIG. 2 is a representation of the display device of the present invention where a crew member is shown selecting a symbol representing a particular surrounding aircraft.

Now referring to FIG. 2, there is shown a representation of the display 110 of FIG. 1 showing graphic representation 122 of an aircraft positioned in front of the subject aircraft. It can be seen that light emitters 115 and 117 would have their light occluded by a crew member's finger when it is positioned on representation 122. In such cases, a selection signal can be derived from the outputs of detecting diodes 116 using well known technologies of touch screens. Additionally the light emitters may be pulsed at predetermined frequency and the detectors being specially adapted to detect and discriminate pulses at a predetermined frequency in order to enhance operation in high ambient light conditions. The area on the screen which is occluded by the pilot's finger is then associated with the representation 122 by well known techniques of graphic user interfaces. When the association is made between the pilot's finger and the unique track file output by the R/T which corresponds to representation 122, one salient feature of the invention has occurred. The pilot has now identified an individual aircraft by selecting it from among the several representations as one that should be treated uniquely. This unique identification of an aircraft is quite desirable and provides the basis for the beneficial aspects of the invention.

Figure 3A:
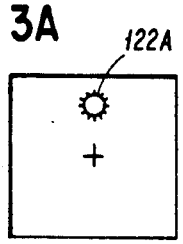
FIG. 3A is a schematic representation of the display device of the present invention which shows a symbol corresponding to a particular aircraft in a highlighted fashion.

Now referring to FIG. 3A, there is shown a representation of the display screen of display device 110 wherein the representation 122A represents the representation 122 of FIGS. 1 and 2 in a highlighted fashion. The highlighting of a particular selected portion of the display screen can be accomplished by using skills well known in the art of touch screens, mouses, and other graphic user interfaces.

The actual apparatus to create the highlighted symbol by assigning a selection signal from the touch screen device with the position signal from the R/T corresponding to the same aircraft and there after manipulating the display to indicate the highlighted matter, may be an electronic hardware circuit, a software controlled processor chip or a combination of the two depending on the preference of the user. Both technologies are well known in the art.

This highlighted representation would be particularly useful to the pilot if the protected aircraft were maneuvered, thereby causing a relatively quick rotation or translation of all the displayed intruder aircraft. In such circumstances, the pilot could more easily detect which aircraft he had selected because the highlighted representation 122A would remain associated with the same aircraft as it had represented prior to the maneuver. This feature is accomplished by modifying the display screen only and only using well known techniques.

Figure 3B:
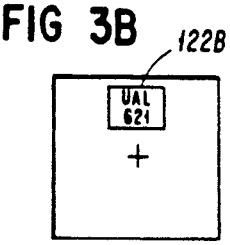
FIG. 3B and 3C are schematic representations of a display device of the present invention which shows an informational window positioned at a point corresponding to a selected aircraft, where different textual information is provided in each figure.

Similarly, FIG. 3B includes a representation 122B which corresponds to the representation 122 of FIGS. 1 and 2 which shows the representation 122 with additional textual data relating to the flight information of the aircraft. This additional textual information is included in the track file associated with the aircraft represented by representation 122, and is preferable provided as part of the mode S transponder response which is described in more detail below in the discussion of FIG. 5.

Figure 3C:
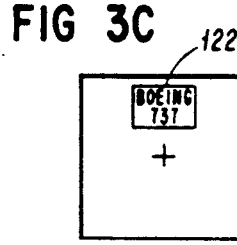

Likewise, FIG. 3C includes a representation 122C which corresponds to the representation 122 of FIGS. 1 and 2 which includes aircraft-type information corresponding to the aircraft represented by representation 122. Both representations 122B and 122C may be particularly helpful when a pilot is trying to follow a particular aircraft. The choice of what additional text is provided is a matter of customer preference, designers choice, or industry standard.

Figure 4:
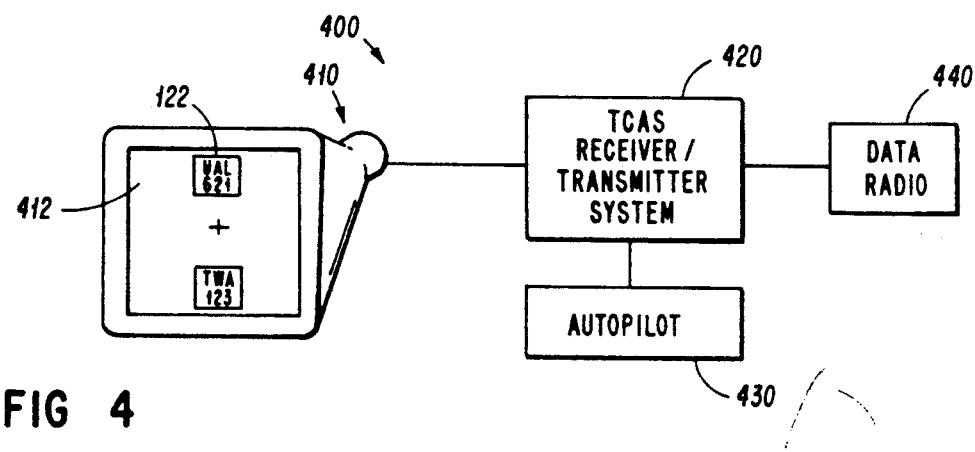
FIG. 4 is a schematic representation of an improved ATC/TCAS system of the present invention together with intercoupling with the aircraft autopilot.

Now referring to FIG. 4, there is shown an improved air traffic control system of the present invention, generally designated 400, which is mounted in the protected aircraft only and does not require changes on other aircraft. The system includes an interactive display terminal 410, an enhanced TCAS R/T system 420, an aircraft autopilot system 430 and a data radio 440. Interactive display terminal 410 is an interactive touch-sensitive display device similar to terminal 110 (FIG. 1). TCAS R/T system 420 is preferably similar to known TCAS R/T and transponder systems, but with the additional capability of uniquely identifying individual aircraft selected by the pilot. The current TCAS system has the capability of individually storing in its track file, the unique ID number, range, bearing and altitude for each intruder aircraft, having a mode S transponder. Autopilot 430 is well known in the art and is typically capable of providing automatic manipulation of the aircraft control surfaces, throttle, etc. in response to continuously changing information from various sources. Data radio 440 is coupled to TCAS R/T 420 and provides additional information on particular aircraft from ground sources. The need for the data radio to communicate information is dependent on the amount of information desired and the extend of the data provided with the Mode S transponder responses to interrogations.

In operation, the system of the present invention functions as follows: The TCAS R/T system 420 detects intruding aircraft located in a predetermined region surrounding the protected aircraft. These intruding aircraft are graphically displayed on the screen 412 of display device 410. The pilot of the protected aircraft can select an intruding aircraft to be highlighted or followed by touching the spot on the screen 412 representing the intruding aircraft and thereby generating a selection signal which is provided to TCAS 420. See FIGS. 2, 3, and 5 and accompanying text. When a particular intruding aircraft is selected, its representation on the screen 412 is changed to indicate the selection. The TCAS R/T 420 is able to monitor the position of the selected aircraft and to generate selected position signals corresponding to the selected aircraft for use by the autopilot 430. Autopilot 430 generates commands to the aircraft control surface, throttle, etc. to maintain a predetermined distance and direction from the selected aircraft. In this system, the pilot need only select the aircraft to be followed and the TCAS R/T system 420 and autopilot 430 are able to generate position signals and control commands respectively.

With the ATC system of the present invention the narrow flight corridors may be more fully exploited. For example, the trans-oceanic aircraft may, with the assistance of the present invention, follow each other through the corridor while maintaining a separation of approximately 3 miles, or some other desired distance. An aspect of the present invention is essentially an improved apparatus for more easily performing a "tail chase" routine through the corridors. This "tail chase" can also be very helpful in increasing the rate of take-offs and landings from busy airports under IFR conditions.

Another beneficial aspect of the present invention, which also does not require making any changes on aircraft other than the protected aircraft, is the ability to operate TCAS on several variable discreet sets of threat calculations and advisory rules for different intruding aircraft. For example, if a pilot is on approach to a busy airport and has visual contact with an aircraft in the immediate vicinity, and is keenly aware of the situation, the pilot may wish to have a less stringent set of criteria for issuing advisories apply to that one aircraft, while not affecting the criteria for other aircraft. This enables the pilot to keep the TCAS turned on longer when approaching a busy airport, thereby enhancing air safety. The pilot accomplishes this by selecting the desired threat criteria in a manner similar to the process described for selecting additional textual information on an aircraft. See FIGS. 3D, 3C, and 5 and accompanying text. The method for switching between textual information or between threat criteria is a matter of personal preference. On some aircraft the SAW with its discreet pressure levels may be best while other users might prefer a series of touches on the optical touch screen or a selection based on duration of the touch. All such methods are well known to persons skilled in the art of touch screens, mouses and graphic user interfaces.

Figure 5:
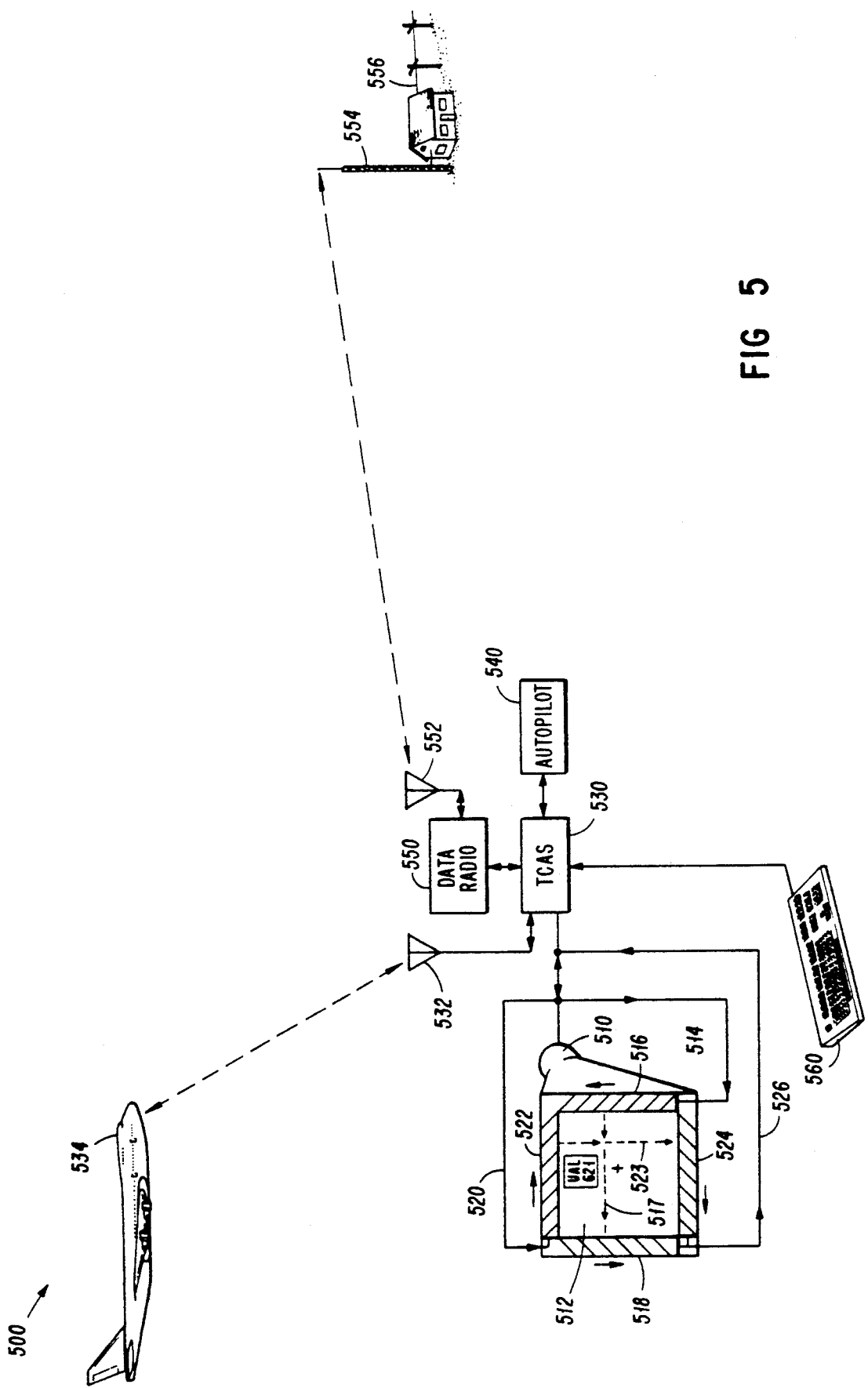
FIG. 5 is a schematic representation of an improved ATC/TCAS system of the present invention which shows additional means for inputting information regarding a particular intruding aircraft.

Now referring to FIG. 5 there is shown an enhanced ATC system of the present invention. FIGS. 5 and 3B and 3C show functions that would be preferably implemented by providing the illustrated equipment both on board the protected aircraft (not shown) as well as on the intruder's aircraft 534.

The ATC system 500 includes a means for displaying 510 information to the pilot and crew. Means 510 is preferably a CRT or LCD but any suitable display device may be substituted. Means for displaying 510 preferably responds to signals from the TCAS 530. Means for display 510 preferably has disposed about its viewing screen 512 a SAW touch screen, which are well known in the art. A typical SAW touch screen operates by inputting signals on line 514 where they are reflected by reflectors 516 across the screen 512 to reflectors 518 and then to output line 526. Similarly, input signals are supplied to line 520 reflected off reflector 522, traverse the screen 512, as wave 523 to reflectors 524 and are output on line 526 to TCAS 530. Line 526 therefore carries the selection signals which are derived from analyzing the signals traversing screen 512.

Preferably the graphic representation displayed on the screen 512 is determined by the pressure applied to the particular representation. For example, in a preferred embodiment a relatively light touch of representation 122 (FIG. 2) could result in generating a predetermined selection signal corresponding to the first representation 122A (FIG. 3A) then would generate a second predetermined selection signal corresponding to a next level representation 122B (FIG. 3B). Similarly, an even heavier touch would scan through the earlier representation of FIGS. 3A and 3B and would display a representation 122C (FIG. 3C). An even heavier touch would result in a selection of the aircraft for trailing purposes. Other variations of these representations as a function of touch, pressure or time, such as color changes or flashing representations are contemplated and are largely determined by the user's personal preference.

TCAS 530 is similar to TCAS which are well known in the art, but may have additional abilities to uniquely identifying, to the pilot, intruding aircraft by their aircraft ID., altitude, flight number, etc. The mode S transponders presently in use are designed to communicate other data besides the ID number and the altitude, but are not being utilized fully. Additional textual information such as flight information (see FIG. 3B) and aircraft type (See FIG. 3C) could be added to the mode S transponder (not shown) in the TCAS 530 through Keyboard 560. For example, when the equipment is installed on the aircraft the aircraft type could be entered into the mode S transponder. Likewise, at the beginning of each flight the crew can add the flight # to the automatic response of the mode S transponder.

When the TCAS 530 uniquely identifies the intruding aircraft through mode S address, the TCAS 530 can assign even more information to that aircraft. This additional information may be provided through data radio 550 which is communicating through antenna 552 to ground station 554, which is communicating with other sources by telephone 556.

The systems of FIGS. 1, 4, and 5 are described separately, but it is intended that the novel aspects of each may be combined or omitted in a hybrid system depending on the personal preference of the use.

It is believed that the present invention and many of its attendant advantages will be understood from the foregoing description, and it will be apparent that various changes may be made in the form, construction, and arrangement of the parts thereof without departing from the spirit and scope of the invention or sacrificing all of its material advantages. The form herein before described being merely preferred or exemplary embodiments thereof. It is the intention of the following claims to encompass and include all such changes.

I claim:

1. An improved air traffic control system for use on trans-oceanic flights of a protected aircraft having a state of operation, equipped with TCAS, the system comprising:

means for determining the relative positions of a plurality of intruding aircraft situated in space about the protected aircraft;

a display means, having a viewing surface having a center region, for graphically representing the relative positions of each of said plurality of intruding aircraft with respect to said protected aircraft, the protected aircraft being represented on said viewing surface by a fixed reference character disposed in said center region, each of the plurality of intruding aircraft being represented by a different signal reference mark on said viewing surface;

a pressure sensitive touch screen interactive display device disposed about said viewing surface so that, a selection signal is generated when a human finger is pressed against one of said reference marks on said viewing surface, said one of said reference marks corresponding directly to one of said plurality of said intruding aircraft;

means for altering said one of said reference marks on said viewing surface in response to said selection signal;

means for receiving data relating to said one of said plurality of intruding aircraft in response to said selection signal; and means for manipulating the state of operation of the protected aircraft in response to said selection signal so that said protected aircraft maintains a predetermined distance from said one of said intruding aircraft.

* * * * *